United States Patent [19]
Leibfried et al.

[11] Patent Number: 5,083,371
[45] Date of Patent: Jan. 28, 1992

[54] HOLLOW METAL ARTICLE FABRICATION

[75] Inventors: Peter E. Leibfried, Vernon; Raymond P. Ristau, Tolland, both of Conn.; Steven F. Keeney, Jupiter, Fla.; Dennis Wentworth, Wales, Mass.

[73] Assignee: United Technologies Corporation, Hartford, Conn.

[21] Appl. No.: 583,262

[22] Filed: Sep. 14, 1990

[51] Int. Cl.⁵ .............................................. B23P 15/04
[52] U.S. Cl. .................................. 29/889.72; 29/289.7; 228/157
[58] Field of Search ........... 29/889.72, 889.7, 889.721; 416/232, 236 R; 228/157, 161, 170, 193, 243

[56] References Cited

U.S. PATENT DOCUMENTS

| | | | |
|---|---|---|---|
| 3,628,226 | 12/1971 | Nelson | 29/889.72 |
| 3,736,638 | 6/1973 | Stone, Jr. | 29/889.72 |
| 4,043,498 | 8/1977 | Conn, Jr. | 29/889.72 |
| 4,089,456 | 5/1978 | Toppen et al. | 29/889.721 |
| 4,364,160 | 12/1982 | Eiswerth et al. | 29/889.721 |
| 4,642,863 | 2/1987 | Schulz | 29/889.72 |
| 4,768,700 | 9/1988 | Chen | 29/889.721 |
| 4,811,890 | 3/1989 | Dowling et al. | 228/157 |
| 4,833,768 | 5/1989 | Ecklund et al. | 228/157 |
| 4,882,823 | 11/1989 | Weisert et al. | 29/889.72 |
| 4,916,928 | 4/1990 | Ecklund | 228/157 |
| 4,934,580 | 6/1990 | Sutton | 228/157 |

Primary Examiner—Irene Cuda

[57] ABSTRACT

A process is described for producing hollow articles from high strength, high temperature metals such as titanium alloys. A finite element analysis is used to determine a preform configuration in which the external surface of the finished article is translated into a flat plane. All machining is performed on flat stock on only one side, and includes mating cavities which define the hollow portion of the article. The preforms are die forged and diffusion bonded and then superplastically inflated to fit the contour of a cavity in a die, which provides the external contour of the article.

9 Claims, 4 Drawings

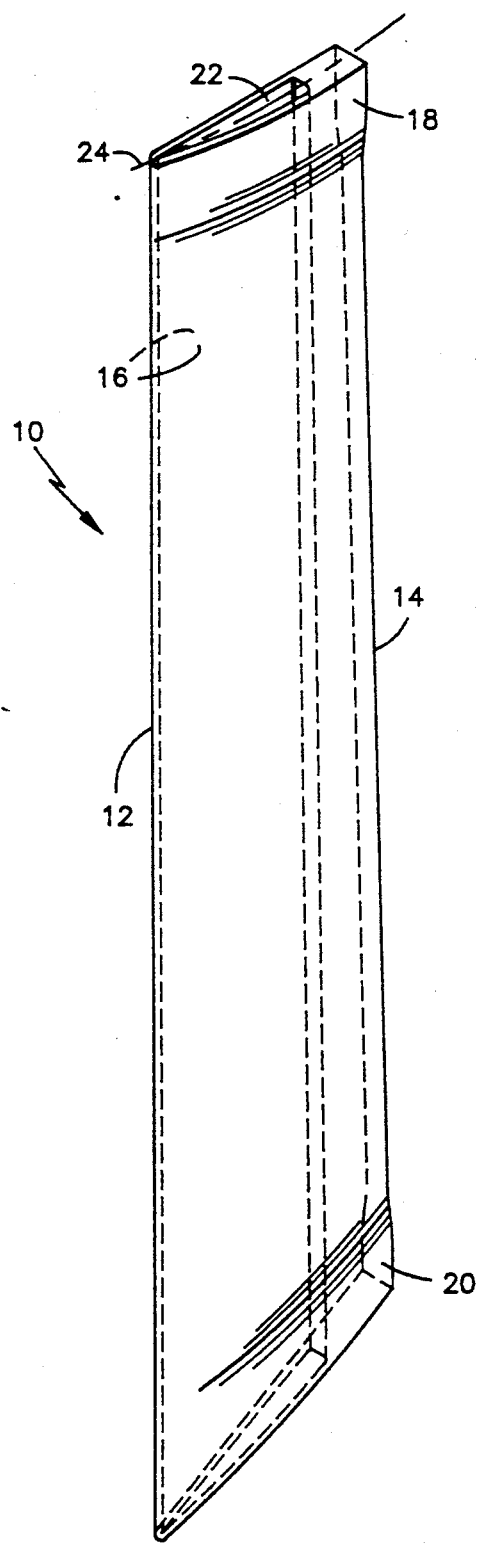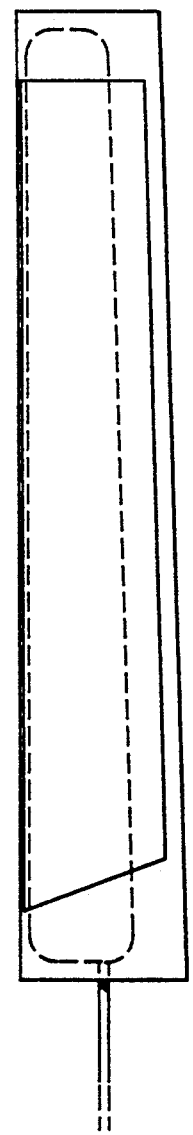

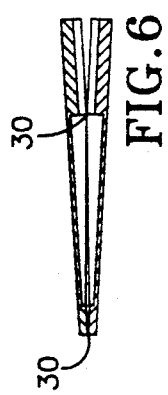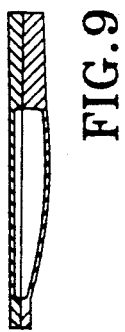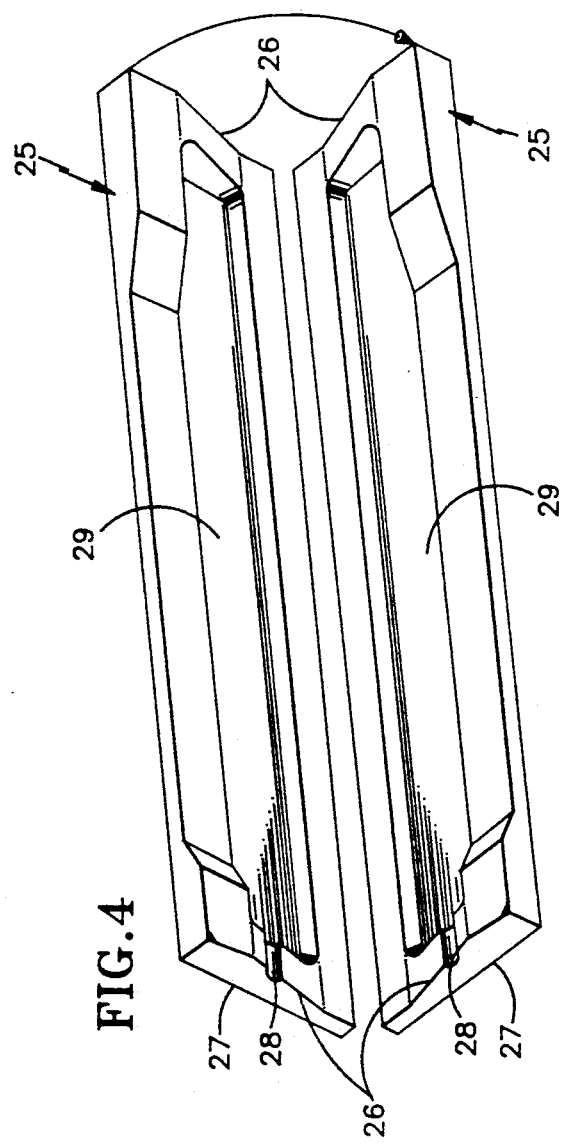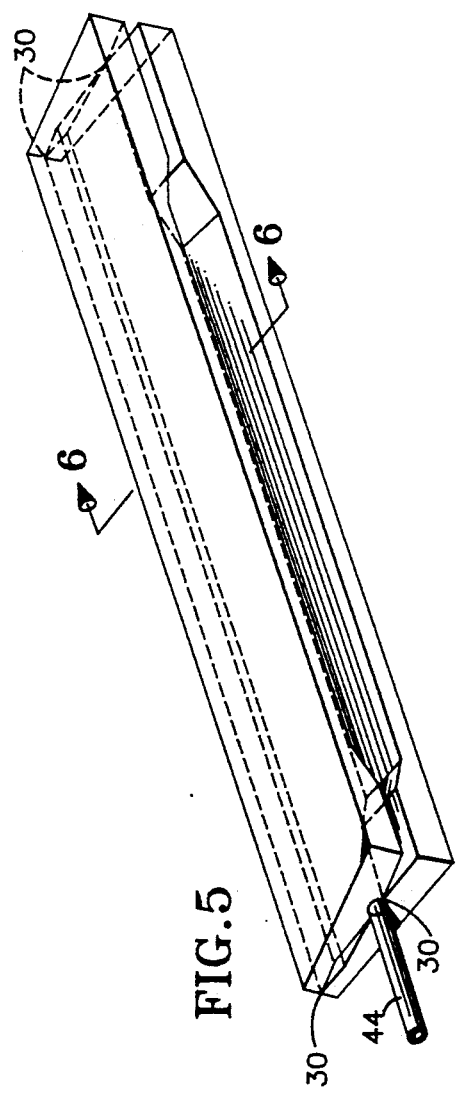

HOLLOW METAL ARTICLE FABRICATION

This invention was made under a Government contract and the Government has rights herein.

TECHNICAL FIELD

The present invention relates to the fabrication of hollow metal structures, and more particularly to an improved method for making hollow airfoil type structures utilizing one side machining of preforms, forging, diffusion bonding, and superplastic inflation forming techniques.

BACKGROUND ART

Gas turbine engines have been extensively developed and find particular utility in aircraft propulsion. As performance and efficiency requirements become increasingly stringent, weight reduction becomes exceptionally important. Accordingly, many gas turbine engine components are desirably fabricated with hollow interiors.

Many techniques have been developed for the fabrication of these hollow components. Typical operations include machining, forging, casting, and bonding. These operations, among others, are found in various combinations in, for example, U.S. Pat. Nos. 3,623,204; 3,628,226; 4,089,456; 4,364,160; and 4,642,863, which are incorporated herein by reference.

These fabrication processes all involve complex machining operations (invariably on all sides of preforms), a multiplicity of components, numerous operations, and/or complex tooling. All of these factors increase fabrication time and cost.

Accordingly, it is an object of the present invention to fabricate hollow airfoils using simplified machining concepts and simple bond tooling while assuring that the finished article will have the required configuration.

This and other objects and advantages of the present invention will be made clear through reference to the following description of the preferred embodiments, figures, and claims.

DISCLOSURE OF INVENTION

The invention process separates the article to be fabricated into two or more segments along a plane which defines surfaces along which the segments will be bonded. In order to provide a starting segment configuration, a finite element analysis is performed to simulate the manufacturing operations in reverse, i.e., go from the finished article geometry to the required starting segment geometry.

The finite element analysis determination of preform geometry includes the general steps of starting with a segment of the finished article, constructing a grid throughout the segment, and applying the stresses involved in the inverse of the manufacturing operations to simulate the movement (or strain) of the metal for each grid point. This procedure defines the preform configuration required to produce the segment of the finished article. The finite element analysis calculations are commonly performed using well-known established computer programs.

FIG. 1 shows a typical airfoil cross-section which has been divided into two segments. A finite element analysis grid has been constructed in one segment. The dashed lines show extra material, required for the fabrication process, which is removed in a finishing operation. FIG. 2 shows the preform configuration determined by finite element analysis. Comparison of grid points A,B,C,D,E and F of FIG. 1 with the corresponding grid points A',B',C',D',E' and F' of FIG. 2 indicate how the finite element analysis has predicted the metal will flow during the fabrication operations.

One of the features of this invention is that the outer surface of the object can be transformed by the finite element analysis calculations to a flat surface in the preform. Thus, the preform can be made from rectangular material with machining performed on only one side of the rectangular starting material. This is shown by the dashed lines of FIG. 2.

The bond surfaces and the recessed area of each preform segment are machined such that when the two segments are aligned and bonded, a hollow intermediate article with an internal cavity is formed. Although it will usually be the case that mating cavities are machined in the preforms, it is possible that, for some designs, machining of only one side of only one preform would be feasible. Since the finished article has curved outer surfaces it is essential that some deformation (forging) of the material occurs in the bond regions before or during the bonding operation. This deformation is also essential for producing good bond joints.

There is no internal support for the thin regions which define the cavity during the forging and bonding operations. Thus, elevated pressure is applied internal to the hollow article while at elevated temperature. This operation, called superplastic inflation, assures that the bonded preform assumes the configuration of a cavity machined into the die used for the inflation operation.

After these fabrication operations have been completed, excess material is trimmed from the edges of the preform to finish the article.

The foregoing and other features and advantages of the present invention will become more apparent from the following description and accompanying drawings.

BRIEF DESCRIPTION OF THE DRAWINGS

FIG. 3 is a perspective view of a hollow airfoil to be fabricated.

FIG. 4 is a perspective view of two preform segments as machined.

FIG. 5 is a perspective view of the two preform segments aligned in preparation for forging and bonding.

FIG. 6 is a cross-sectional view at Section 6—6 of FIG. 5.

FIG. 9 is a cross-sectional view at Section 9—9 of FIG. 8.

FIG. 10 shows the outline of the finished hollow airfoil overlaid on the preform of FIG. 8.

BEST MODE FOR CARRYING OUT THE INVENTION

Figure 1:
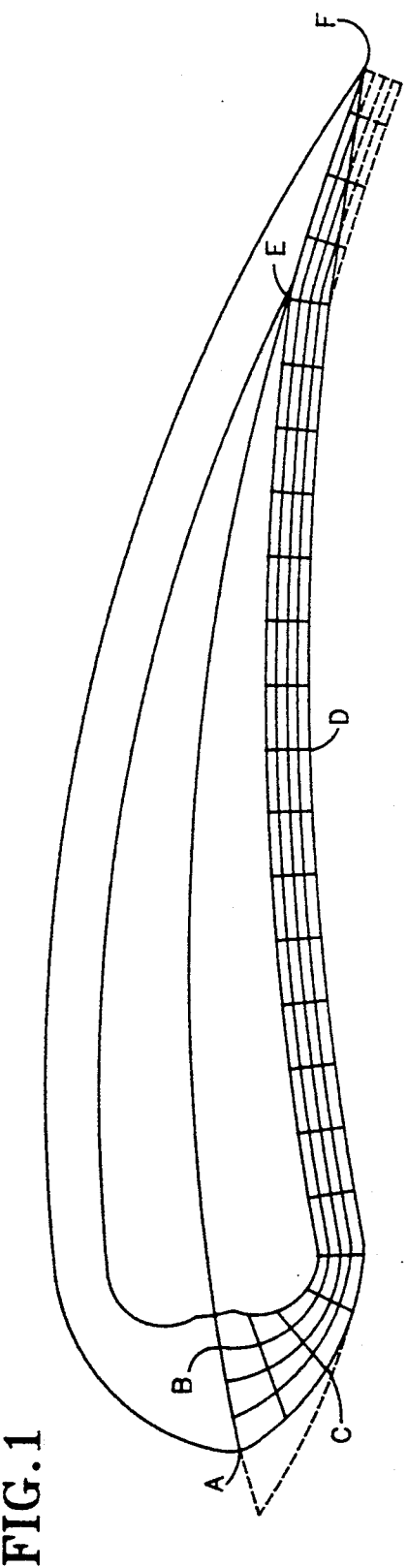
FIG. 1 is a cross-sectional view of a segment of a finished object, with a finite element grid superimposed on one segment.

The invention process is best understood through consideration of FIGS. 1 through 10 which illustrate the fabrication sequence for formation of a hollow airfoil.

Referring first to FIG. 3, the finished airfoil 10 is defined by a leading edge 12, a trailing edge 14, airfoil surfaces 16, a tip region 18, and a root region 20. A hollow portion 22 extends the full length of the airfoil.

The airfoil is separated into two segments along the neutral stress plane 24. The neutral stress plane 24 is that plane within the airfoil in which the operating stresses change from tensile to compressive, and is thus the location of minimum stress. Thus, after bonding along the neutral stress plane, any potential weakness in the bond joint occurs where the operating stresses are at a minimum.

Figure 2:
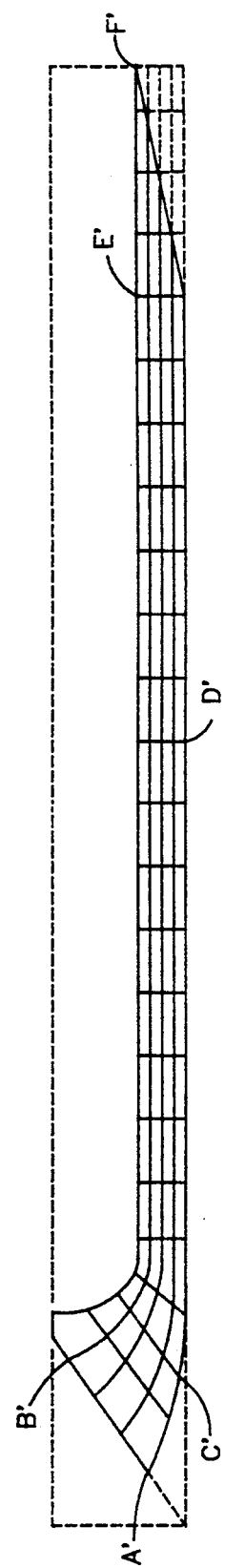
FIG. 2 is a cross-sectional view of a preform configuration after finite element analysis has been performed on the segment shown in FIG. 1.

Finite element analysis, previously discussed in regard to FIGS. 1 and 2, is performed to reverse the sequence of manufacturing operations used to form the airfoil segments. The finite element calculation models the material movement during forging as it is affected by temperature, pressure, and strain rate. In the present invention, the outer surfaces of the airfoils are translated to flat surfaces, with built up areas appropriately located to generate the airfoil structure. Extra material is added all around the outline of the preform segments for handling purposes, and a minimum form (usually rectangular) which completely encompasses the preform segments is generated.

In order to successfully produce components by this method, the starting material must be superplastic at the bonding and forming conditions to be used; i.e., it must be capable of being plastically deformed large amounts without incurring localized thinning during deformation. This generally occurs at elevated temperatures, low strain rates, and relatively low loads, and is often dependent on material properties, such as grain size and texture. Several materials including alpha-beta titanium alloys, some steels and some nickel-based superalloys inherently have, or can be processed to have, superplastic properties.

Referring to FIG. 4, all machining of the preform segments 25 is performed on one side of the rectangular starting material. For this particular configuration, all of the surfaces are machined flat, although some surfaces 26 are at an angle to the reference plane 27, which is one of the original surfaces of the rectangular starting material. Mating grooves 28 are machined into the preform segments 25 to receive an inflation tube. Machined cavities 29 are located in the preform segments so as to provide the cavity in the hollow article.

Referring to FIG. 5, the two preform segments 25 are positioned appropriately for the bonding operation. An anti-bonding material, such as yttrium oxide, is usually applied to the surfaces where bonding is not desired, in this case, the recessed areas 29 of the preform segments 25 which form the cavity in the hollow article. Tack-welds 30 are used to hold the segments in position relative to each other, although various other methods, including tabs, pins, etc., could be satisfactorily used.

FIG. 6 is a cross-section at Section 6—6 of FIG. 5 showing the relationship of the segments ready for forging and bonding.

Figure 7:
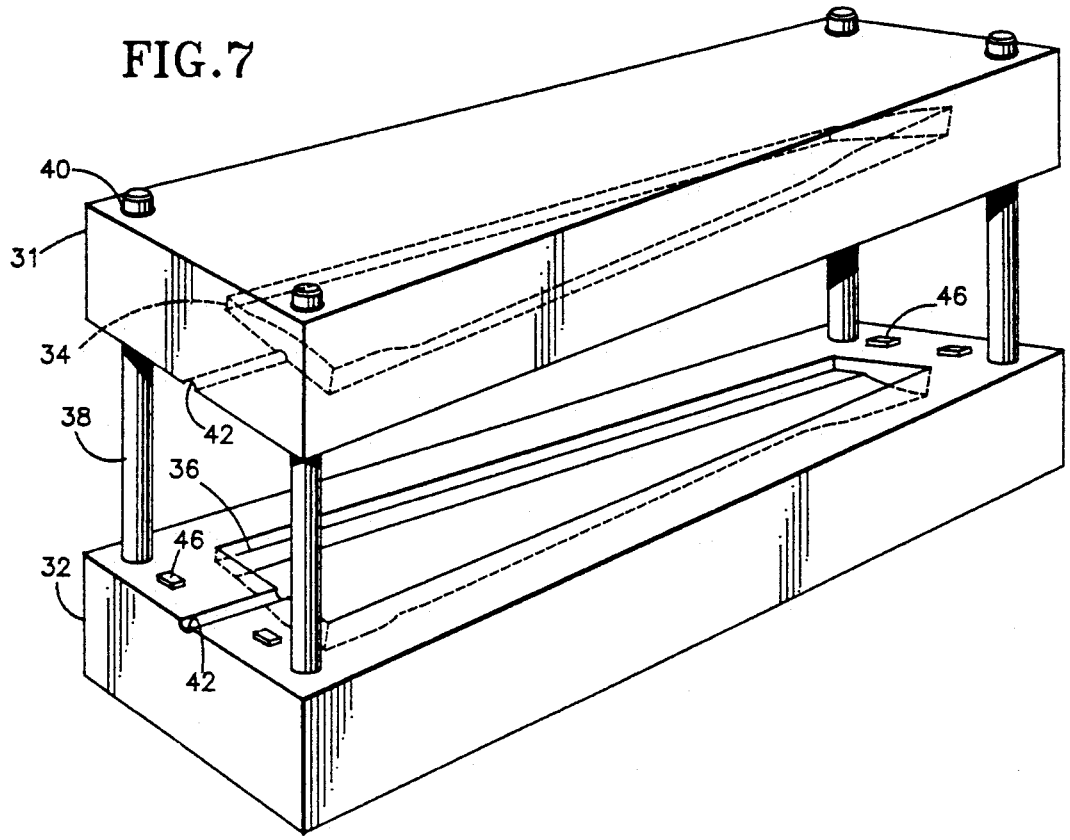
FIG. 7 is a perspective view of the mating halves of the die used to forge and bond the preform.

Referring to FIG. 7, the two halves of a forging die 31, 32 having cavities 34, 36 machined to conform to the outer surface contours required in the finished airfoil, are shown. Proper alignment of the die halves during processing operations is assured by four posts 38 which fit into four holes 40. Mating grooves 42 are machined into the two die halves such that they will align with the grooves 28 in the airfoil segments and receive the inflation tube 44.

Although the materials commonly used for these applications exhibit superplasticity and high ductility at elevated temperatures, relatively high forces are required for forging. Practical die materials available for these forging, bonding and inflation operations include superalloys, some steels, and molybdenum based materials, such as TZM molybdenum. TZM molybdenum has the advantage that it is more resistant to creep, and thus retains its shape longer than the other materials over a long production run. However, TZM molybdenum is exceedingly susceptible to oxidation at temperatures greater than about 800° F., and, consequently, its use requires that elevated temperature operations be performed under non-oxidizing atmosphere or high vacuum conditions. This would also assure good bonding conditions for materials such as titanium alloys, which are highly susceptible to oxidation.

The assembled components shown in FIG. 5 are placed in the forging die, and an inflation tube 44 is inserted through the mating grooves 42 in the die into the hole formed by the mating grooves 26 in the assembled preform. The material for the inflation tube 44 is selected to withstand the bonding pressure without collapsing and to have a thermal expansion coefficient greater than that of the airfoil material. Thus, the tube will expand to form a tight seal when heated to the inflation temperature, and then will contract during cooling to facilitate removal of the tube from the completed preform.

The forging die with assembled components in position is placed in a forging press capable of applying the required force to the surfaces of the die. The die and assembled preform components are raised to the forging/bonding temperature. When the forging pressure is applied to the die, the two halves of the die move toward each other, and the superplastic material of the two preform segments is forged to conform to the die cavity, with the material in the bond areas providing support for forging. By this means, the appropriate curvature is formed on the leading and trailing edges where rectangular cross-sections were present in the preform segments. Stop blocks 46 are sized and positioned to limit the travel of the die while permitting a minimum of 8% deformation in all regions where the bond surfaces are in contact.

Figure 8:
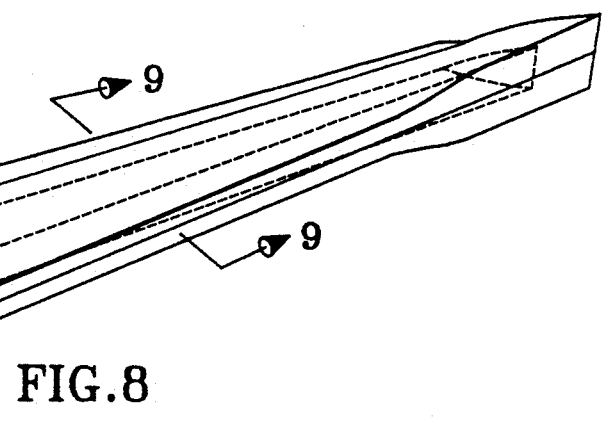
FIG. 8 is a perspective view of the airfoil preform after forging, bonding, and superplastic inflating.

When the die segments have moved to the limit of their motion, the forging pressure is maintained for a period of time sufficient to permit diffusion bonding at the contacting surfaces of the preform segments. At the end of this bonding period, a pressurized non-oxidizing inflation gas is introduced through the inflation tube into the preform cavity. The inflation pressure is sufficient to force the thin regions which define the cavity of the hollow article outward against the die cavity inner surfaces, thus establishing the final configuration of the airfoil surfaces. Additionally, if slight waves are present in the thin regions, the superplastic nature of the material allows their removal without buckling as the finished airfoil configuration is established. FIG. 8 shows the completed airfoil preform, while FIG. 9 shows a cross-section at Section 9—9 of FIG. 8.

The airfoil preform is machined to the outline shown in FIG. 10, and additional machining or hand finishing is done as necessary to finish the leading and trailing edge contours. This is necessary only in those limited areas where additional material was added to facilitate fabrication and thus, the final airfoil contours were not fully defined by the mold cavity. Additional components are added to provide, for example, mounting or pivot features to complete the part.

As an example of the present invention, a hollow airfoil was fabricated from Ti-6Al-4V alloy according to FIGS. 2 through 10. After machining to the configuration of FIG. 4, yttrium oxide was applied to the cavities in the preform segments as an anti-bonding material, and the preform segments were tack welded together.

TZM molybdemum was selected as the die material because of its greater resistance to creep than steel or nickel-base superalloys.

The forging and bonding operations were conducted concurrently. A temperature of 1700° F. and a pressure of 2000 psi, based on the contact area of the bond surfaces, were used, with the conditions being maintained for a period of 60 minutes to provide the optimum bond strength.

While the forged and bonded preform was still in the forging press, the superplastic inflation operation was performed. Argon gas was introduced through the inflation tube at a pressure of 200 psi, and held at 1700° F. for a period of 15 minutes, which assured that the airfoil contours matched the die cavity.

The article was then completed by cutting the preform to the outline of the airfoil, and shaping the leading and trailing edges to remove the extra material added for handling purposes.

While this example has depicted the forging, bonding and inflation steps as connected operations in the same equipment, they could also be performed as discrete operations.

Although this invention has been shown and described with respect to detailed embodiments thereof, it will be understood by those skilled in the art that various changes in form and detail thereof may be made without departing from the spirit and scope of the claimed invention.

We claim:

1. A method for fabricating a hollow metal article including the steps of:
   a. machining one side only of at least one of at least two mating preform segments to a predetermined preform configuration which includes at least one recessed area in said segments;
   b. forging and bonding said preform segments in a forging die so that the outer surfaces of said preform segments essentially conform with the inner surfaces of a cavity in said forging die and the non-recessed areas of the preform segment are bonded together, thus forming a bonded article containing at least one internal cavity;
   c. inflating said bonded article by forcing high pressure non-oxidizing gas into said at least one internal cavity in said bonded article such that said outer surfaces of said bonded article conform to the inner surfaces of a cavity in an inflation die; and
   d. machining said article to a desired final configuration.

2. A method as in claim 1 wherein said hollow article is a gas turbine engine airfoil.

3. A method as in claim 1 wherein said mating segments have a configuration determined by a finite element analysis technique which reverses the sequence of manufacturing operations used to produce said article such that said outer surfaces are translated to a flat plane on which is built up material necessary to produce solid portions of said article, thus permitting all machining operations to be performed on one side of said preform segments.

4. A method as in claim 1 wherein bonding occurs along the neutral stress plane of said finished article.

5. A method as in claim 1 wherein the steps of forging, bonding and inflation are performed as a single series of operations in the same tooling.

6. A method as in claim 1 wherein the tube which provides high pressure gas to inflate said hollow article inside said die has a coefficient of thermal expansion greater than that of the material of said hollow article.

7. A method as in claim 1 wherein said material used to fabricate said hollow article has superplastic properties at the fabrication temperature.

8. A method as in claim 1 wherein the areas of said preform segments which define a cavity are coated with an anti-bonding material.

9. A method as in claim 1 wherein each of two of said preform segments includes a recessed area.

* * * * *